United States Patent [19]

Baumgaertel et al.

[11] Patent Number: 5,124,373

[45] Date of Patent: Jun. 23, 1992

[54] UNPLASTICIZED POLYVINYL CHLORIDE-BASED MOLDING COMPOSITION, PROCESS FOR ITS PREPARATION AND ITS USE

[75] Inventors: Hans-Georg Baumgaertel, Rheinberg; Willy van Cleemputte, Gelsenkirchen, both of Fed. Rep. of Germany; Peter Walz, Saint Claude, France

[73] Assignee: Deutsche Solvay-Werke GmbH, Solingen, Fed. Rep. of Germany

[21] Appl. No.: 571,263

[22] Filed: Aug. 23, 1990

[30] Foreign Application Priority Data

Aug. 23, 1989 [DE] Fed. Rep. of Germany ....... 3927777

[51] Int. Cl.⁵ .................... C08L 27/06; C08K 3/20; C08K 5/05
[52] U.S. Cl. .................... 523/210; 264/176.1; 264/297.2; 524/99; 524/400; 524/357; 524/433; 524/504; 524/425; 524/451
[58] Field of Search .............. 524/147, 99, 400, 399, 524/357, 433, 504; 523/210, 202

[56] References Cited

U.S. PATENT DOCUMENTS

| 3,471,439 | 10/1969 | Bixler et al. | 523/202 |
| 3,969,313 | 7/1976 | Aishima et al. | 523/202 |
| 4,146,517 | 3/1979 | Leistner et al. | 524/147 |
| 4,353,997 | 10/1982 | Keogh | 523/210 |
| 4,719,023 | 1/1988 | Mac Phail et al. | 252/39 |

FOREIGN PATENT DOCUMENTS

| 349225 | 1/1990 | European Pat. Off. | 523/210 |
| 58-096637 | 6/1983 | Japan | 523/210 |

OTHER PUBLICATIONS

Chemical Abstracts vol. 91, 1979 p. 36; 91:176236z

"Rigid compositions based on vinyl chloride polymers heat stabilized using magnesium oxide and a polyalcohol".

Primary Examiner—John C. Bleutge
Assistant Examiner—Christopher P. Rogers
Attorney, Agent, or Firm—Foley & Lardner

[57] ABSTRACT

The present invention relates to a polyvinyl chloride-based unplasticized molding composition which includes vinyl chloride homo-, co- and/or ter-polymer and/or mixtures or alloys thereof having a vinyl chloride or PVC content of more than 70% by weight, preferably more than 85% by weight, and 15 to 0% by weight of at least one impact-modifying polymer, which unplasticized molding composition includes, per 100 parts by weight of the PVC mixture if appropriate, pigments, colorants, lubricants, blowing agents, flame retardants, fillers, reinforcing fibers or other processing auxiliaries and the following additives:

(a) 0.01 to 3 parts by weight of at least one calcium carboxylate,
(b) 0.01 to 3 parts by weight of at least one zinc carboxylate,
(c) 0.01 to 3 parts by weight of at least one organic co-stabilizer selected from at least one $\beta$-diketone, at least one organic phosphite and/or at least one dihydropyridine, and
(d) 0.01 to 5 parts by weight of at least one surface-modified alkaline earth metal oxide, at least one alkaline earth metal hydroxide and/or at least one partly hydrated alkaline earth metal oxide.

The invention furthermore relates to the use of the molding composition and the process for its preparation.

36 Claims, No Drawings

UNPLASTICIZED POLYVINYL CHLORIDE-BASED MOLDING COMPOSITION, PROCESS FOR ITS PREPARATION AND ITS USE

BACKGROUND OF THE INVENTION

The present invention relates to a polyvinyl chloride-based unplasticized molding composition comprising, per 100 parts by weight of plastic, more than about 70% by weight, preferably more than about 85% by weight (relative to plastic), of vinyl chloride homo-, co- and/or ter-polymer and/or mixtures or alloys of vinyl chloride homo-, co- and/or ter-polymer having a vinyl chloride or PVC content of more than about 70% by weight, preferably more than about 85% by weight, and about 15 to 0% by weight of at least one impact-modifying polymer, or of the corresponding monomer component in the case of copolymers, selected from the group comprising alkyl acrylates, chlorinated polyethylenes, ethylene-vinyl acetate copolymer or ethylene-vinyl acetate-carbon monoxide terpolymer and other additives, processing auxiliaries and the like. According to the present invention, the polyvinyl chloride-based plastic molding composition includes a certain amount of parts by weight of at least one co-stabilizer, at least one surface-treated alkaline earth metal oxide and/or at least one partially hydrated alkaline earth metal oxide and other additives.

The invention furthermore relates to a process for the preparation of the molding composition and the use thereof for extrusion.

EP-B-0,001,859 discloses a rigid, heat-stabilized composition based on vinyl chloride polymers which includes as heat stabilizers magnesium oxide and a saturated polyhydric aliphatic alcohol and also calcium stearate and zinc stearate and other processing auxiliaries and additives. These heat-stabilized compositions are particularly suitable for the preparation of pipes and profiles. They have the advantage that they are lead-free and cadmium-free. However, the heat stability and processing properties of these compositions are in need of improvement.

SUMMARY OF THE INVENTION

It is therefore an object of the present invention to provide a molding composition having improved properties and/or improved processing properties and a process for the preparation thereof. It also is an object to provide molded articles prepared from the molding composition which have improved properties. In particular, the molding composition must have improved heat stability during processing. Moreover, the use of lead-containing and cadmium-containing stabilizers must be avoided. The risk of corrosion occurring on processing the molding composition in an extruder also must be reduced.

In accomplishing the foregoing objects there is provided according to the present invention a polyvinyl chloride-based unplasticized molding composition comprising, per 100 parts by weight of plastic, more than about 70% by weight of at least one PVC component selected from the group consisting of a vinyl chloride homo-, co- and ter-polymer, mixtures thereof and an alloy of vinyl chloride homo-, co- and ter-polymer having a vinyl chloride or PVC content of more than about 70% by weight, about 15 to 0% by weight of at least one impact-modifying polymer component selected from the group consisting of an alkyl acrylate, a chlorinated polyethylene, an ethylene-vinyl acetate copolymer and an ethylene-vinyl acetate-carbon monoxide ter-polymer, and, for every 100 parts by weight of the PVC component, the following additives:

(a) about 0.01 to 3 parts by weight of at least one calcium carboxylate, (b) about 0.01 to 3 parts by weight of at least one zinc carboxylate, (c) about 0.01 to 3 parts by weight of at least one organic co-stabilizer selected from the group consisting of $\beta$-diketone, organic phosphite and dihydropyridine, and (d) about 0.01 to 5 parts by weight of at least one ingredient selected from the group consisting of an alkaline earth metal oxide, an alkaline earth metal hydroxide and a partially hydrated alkaline earth metal oxide, wherein particles of the above ingredient are coated with a surface modifying conditioning or coating agent on their entire surface or on a portion of their surface.

There also is provided a process for preparing the above-described polyvinyl chloride-based unplasticized molding composition comprising mixing the plastic components and the additives at a temperature of above about 35° C. in a heating mixer increasing the temperature up to between about 100 and 125° C. and then cooling the molding composition in a cooling mixer to a temperature of below about 40° C.

In addition, there is provided a method of using the above-described unplasticized molding composition in an extrusion or injection molding process for production of profiles or articles. Moreover, there is provided a window profile comprising the above-described molding composition.

Further objects, features and advantages of the present invention will become apparent from the detailed description of preferred embodiments that follows.

DETAILED DESCRIPTION OF THE PREFERRED EMBODIMENTS

The polyvinyl chloride-based unplasticized molding composition according to the present invention comprises, per 100 parts by weight of plastic, more than about 70% by weight, preferably more than about 85% by weight, of vinyl chloride homo-, co- and/or ter-polymer and/or mixtures or alloys of vinyl chloride homo-, co- and/or ter-polymer having a vinyl chloride or PVC content of more than about 70% by weight, preferably more than about 85% by weight, and about 15 to 0% by weight of at least one impact-modifying polymer (or of the corresponding monomer component in the case of copolymers) selected from the group comprising alkyl acrylates, chlorinated polyethylenes, ethylene-vinyl acetate copolymer or ethylene-vinyl acetate-carbon monoxide ter-polymer.

For every 100 parts by weight of this PVC mixture or of the vinyl chloride copolymer the molding composition according to the invention also includes, if appropriate, pigments, colorants, lubricants, blowing agents, flame retardants, fillers, reinforcing fibers or other processing auxiliaries and the following additives:

(a) about 0.01 to 3 parts by weight of at least one calcium carboxylate, (b) about 0.01 to 3 parts by weight of at least one zinc carboxylate, (c) about 0.01 to 3 parts by weight of at least one organic co-stabilizer selected from the group comprising at least one β-diketone, at least one organic phosphite and/or at least one dihydropyridine, and
(d) about 0.01 to 5 parts by weight of at least one alkaline earth metal oxide, at least one alkaline earth metal hydroxide and/or at least one partially hydrated alkaline earth metal oxide, preferably calcium oxide and/or magnesium oxide, and/or partially hydrated calcium oxide and/or partially hydrated magnesium oxide and/or calcined dolomite or partially hydrated calcined dolomite, the alkaline earth metal oxide, alkaline earth metal hydroxide and/or partially hydrated alkaline earth metal oxide, preferably the calcium oxide and/or magnesium oxide, and/or the partially hydrated calcium oxide and/or partially hydrated magnesium oxide and/or the calcined dolomite or the partially hydrated calcined dolomite particles having been coated with a surface-modifying conditioning agent or coating agent on their entire surface or on a portion of their surface.

The calcium carboxylates and/or zinc carboxylates may be salts of calcium and/or zinc with fatty acids and/or derivatives thereof, preferably of fatty acids having polar groups, said fatty acids or derivatives having 8 to 32, preferably 10 to 22, more preferably 15 to 21, carbon atoms. Stearates, hydroxystearates, palmitates and/or behenates or fatty acids or fatty acid derivatives of these compounds having additional polar groups, preferably hydroxyl groups, have proven particularly useful.

In a preferred embodiment, the molding composition also includes
(e) about 0.01 to 15 parts by weight of at least one filler, preferably of at least one inorganic filler.

In another preferred embodiment, the molding composition further includes, per 100 parts by weight of the PVC mixture or of the vinyl chloride copolymer,
(f) about 0.01 to 5 parts by weight of at least one external lubricant and/or internal lubricant, and/or
(g) about 0.01 to 5 parts by weight of a processing auxiliary or additive, preferably selected from the group comprising polymeric alkyl methacrylates.

In a preferred embodiment of the invention, the molding composition includes, per 100 parts by weight of the plastic or plastic mixture, the above-described additives (a) to (g) in the following amounts:
(a) about 0.05 to 1.5 parts by weight of at least one calcium carboxylate,
(b) about 0.05 to 1.5 parts by weight of at least one zinc carboxylate,
(c) about 0.05 to 2 parts by weight of at least one organic co-stabilizer selected from the group comprising at least one β-diketone, at least one organic phosphite and/or at least one dihydropyridine,
(d) about 0.05 to 1 part by weight of calcium oxide and/or magnesium oxide,
(e) about 0.05 to 10 parts by weight of at least one filler, preferably of at least one inorganic filler,
(f) about 0.5 to 5 parts by weight of at least one pigment and/or colorant, external lubricant and/or internal lubricant, and (g) about 0.5 to 3.5 parts by weight of a processing auxiliary or additive selected from the group comprising polymeric alkyl methacrylates, preferably polymethyl methacrylate.

According to the present invention, preference is given to the use of a benzoylstearoylmethane as the β-diketone.

Preference is given to the use of triphenyl phosphite, trilauryl phosphite, diphenyl decyl phosphite, tridecyl phosphite and/or phenyl didecyl phosphite as the phosphites.

In a preferred embodiment of the invention, the co-stabilizer, selected from the group comprising at least one β-diketone, at least one organic phosphite and/or at least one dihydropyridine, is replaced to an extent of up to about 70% by weight (relative to 100% by weight of the co-stabilizer used), preferably up to about 50% by weight, by a polyol. The proportion of the polyol should be less than about 50% by weight, particularly preferably less than about 40% by weight (relative to 100% by weight of the co-stabilizer used), to achieve a particularly improved heat stabilization of the molding composition.

The preferable polyols are trimethylolpropane, di-trimethylolpropane, pentaerythritol and mixtures of these polyols with one another or with other polyols. In another embodiment, the polyol can be replaced by a polyetherpolyol.

In another preferred embodiment, the molding composition further includes, per 100 parts by weight of the PVC mixture or of the vinyl chloride copolymer:
(h) about 0.01 to 10 parts by weight, preferably 0.5 to 5 parts by weight, of a pigment and/or colorant and/or
(i) about 0.05 to 4 parts by weight, preferably 0.1 to 2 parts by weight, of at least one blowing agent and/or
(j) about 0.5 to 10 parts by weight, preferably 1 to 8 parts by weight, of at least one flame retardant.

Useful blowing agents are organic chemical blowing agents and/or inorganic chemical blowing agents, preferably those which evolve nitrogen or carbon dioxide when heated. Preference is given to blowing agents selected from the group comprising azodicarbonamides and/or sodium bicarbonates.

Useful flame retardants include flame retardants known for use in plastics, preferably aluminum hydroxide and/or antimony trioxide.

As mentioned previously, according to the invention the calcium oxide, magnesium oxide, partially hydrated calcium oxide, partially hydrated magnesium oxide, the calcined dolomite and/or partially hydrated calcined dolomite particles can be coated with a surface-modifying conditioning agent or coating agent on their entire surface or on a portion of their surface. Preferably the surface-modifying conditioning agent or coating agent is a saturated or unsaturated fatty acid or esters, salts or derivatives thereof.

In a preferred embodiment of the invention, both the filler or the filler mixture or a portion of the filler or of the filler mixture and the calcium oxide and/or the magnesium oxide particles can be coated with a surface-modifying conditioning agent or coating agent on their entire surface or on a portion of their surface. Advantageously, the surface-modifying conditioning agent or coating agent is a saturated or unsaturated fatty acid or esters, salts or derivatives thereof.

The surface conditioning agents or coating agents are applied in the form of a solution, dispersion, melt or the like. In a preferred embodiment, the surface conditioning agent or coating agent is applied in the hot state or in the form of a melt to the alkaline earth metal oxide or partially hydrated alkaline earth metal oxide, preferably to the calcium oxide, magnesium oxide, partially hydrated calcium oxide, partially hydrated magnesium oxide, calcined dolomite or the partially hydrated calcined dolomite particles. To accomplish this coating, it is desirable to use a heating mixer or a heating mixer/cooling mixer combination.

The surface conditioning agent preferably is applied to the filler in the form of a dispersion or solution of the surface conditioning agent or coating agent.

In a preferred embodiment of the invention, the calcium oxide, magnesium oxide, partially hydrated calcium oxide, partially hydrated magnesium oxide, calcined dolomite and/or the partially hydrated calcined dolomite are surface-modified using a saturated or unsaturated fatty acid which, in addition to the COOH, ester and/or COO group, also includes at least one OH group or at least one other polar group.

In another preferred embodiment, the calcium oxide and/or magnesium oxide and/or the filler or the filler mixture or a portion of the filler or of the filler mixture, which preferably includes finely divided calcium carbonate or is composed thereof, are surface-modified using at least one saturated or unsaturated fatty acid, or esters, salts or derivatives thereof, which in addition to the COOH, ester and/or COO group also includes at least one OH group or at least one other polar group.

The polar group-containing organic carboxylic acids which may be used include saturated and/or unsaturated monocarboxylic acids or polycarboxylic acids, or derivatives, substituted compounds and/or salts thereof. Preferred are organic carboxylic acids which include at least one hydroxyl group, amino group, carbonyl group and/or ester group and are salts of the monocarboxylic acids, preferably fatty acids, or the acids themselves.

Advantageously, the fatty acids include at least one additional polar group and have 8 to 32, preferably 10 to 22, carbon atoms. The fatty acid may be mixed with up to about 20% by weight, preferably up to about 6% by weight, of an unsaturated fatty acid which may include at least one additional polar group. Preferred are hydroxyl-containing fatty acids or amino-containing fatty acids, particularly hydroxystearic acid, hydroxy-palmitic acid, hydroxyoleic acid, aminostearic acid, aminolinoleic acid and/or their alkali metal salts for the surface treatment of the fillers and/or of the magnesium oxide and/or calcium oxide.

In a preferred embodiment, the filler is a synthetic surface-coated calcium carbonate, preferably prepared by introducing carbon dioxide into a calcium hydroxide suspension and then surface-treating the resulting calcium carbonate using an alkali metal salt or ammonium salt of a saturated or unsaturated carboxylic acid, fatty acid or substituted fatty acid which includes at least one polar group, preferably an alkali metal salt or ammonium salt of at least one hydroxyl-, carbonyl-, amino- and/or ester-containing aliphatic monocarboxylic acid or fatty acid. In the course of this preparation, during the surface treatment, the corresponding calcium compound of the fatty acid which includes polar groups is formed on the entire surface or on a portion of the surface of the calcium carbonate.

The surface coating formed on the surface of the synthetic calcium carbonate after application of the conditioning agent preferably includes a calcium salt and/or alkali metal salt and also, if desired, an ammonium salt of at least one $C_{10}-C_{22}$ fatty acid having at least one hydroxyl group.

In another embodiment, the unsaturated carboxylic acid used as a surface conditioning agent for the fillers and/or for the calcium oxide and/or magnesium oxide (or partially hydrated compounds thereof) is a mono- or polyunsaturated, preferably doubly unsaturated, conjugated or non-conjugated carboxylic acid, preferably an alkali metal salt thereof or an ammonium salt of a mono-unsaturated or doubly unsaturated carboxylic acid, or a mixture thereof. In particular, the unsaturated carboxylic acid is crotonic acid, 2-pentenoic acid, 4-pentenoic acid, 2-hexenoic acid, 3-hexenoic acid, 2,4-pentadienoic acid, 3-butenoic acid and/or 3-methylcrotonic acid, but most preferably sorbic acid.

In a preferred embodiment, the mono- or polyunsaturated carboxylic acid or carboxylic acids or a mixture thereof is replaced by up to about 60% by weight (relative to 100 parts by weight of the carboxylic acids used for surface treatment), preferably up to 40% by weight, of a saturated and/or unsaturated $C_2-C_{32}$ monocarboxylic acid having besides the carboxyl groups, polar groups and/or humic acid.

In a preferred embodiment of the invention, the alkyl acrylate used as a modifier, preferably butyl acrylate, is replaced by up to about 60% by weight (relative to 100 parts by weight of the modifier used), preferably up to about 35% by weight, of a polymethyl methacrylate (PMMA).

The vinyl chloride homo-, co- and/or ter-polymer present in the molding composition preferably has a K-value of 58 to 73. Particular preference is given to K-values of 64 to 71.

The present invention furthermore provides a process for the preparation of a polyvinyl chloride-based unplasticized molding composition having per 100 parts by weight of plastic, more than about 70% by weight, preferably more than about 85% by weight, of vinyl chloride homo-, co- and/or ter-polymer and/or mixtures or alloys of vinyl chloride homo-, co- and/or ter-polymer having a vinyl chloride or PVC content of more than about 70% by weight, preferably more than about 85% by weight, and about 15 to 0% by weight of at least one impact-modifying polymer (or of the corresponding monomer component in the case of copolymers) selected from the group comprising alkyl acrylates, chlorinated polyethylenes, ethylene-vinyl acetate copolymer or ethylene-vinyl acetate-carbon monoxide ter-polymer. The process includes additionally mixing together, per 100 parts by weight of this PVC mixture or of the vinyl chloride copolymer, if appropriate, pigments, colorants, lubricants, blowing agents, flame retardants, fillers, reinforcing fibers or other processing auxiliaries and the following additives:

(a) about 0.01 to 3 parts by weight of at least one calcium carboxylate, (b) about 0.01 to 3 parts by weight of at least one zinc carboxylate, (c) about 0.01 to 3 parts by weight of at least one organic co-stabilizer selected from the group comprising at least one $\beta$-diketone, at least one organic phosphite and/or at least one dihydropyridine, (d) about 0.01 to 5 parts by weight of at least one alkaline earth metal oxide, at least one alkaline earth metal hydroxide and/or at least one partially hydrated alkaline earth metal oxide, preferably calcium oxide and/or magnesium oxide, and/or partially hydrated calcium oxide and/or partially hydrated magnesium oxide and/or calcined dolomite or partially hydrated calcined dolomite, the calcium oxide having been coated with a surface-modifying conditioning agent or coating agent on its entire surface or on a portion of its surface, and (e) about 0.01 to 15 parts by weight of at least one filler, preferably at least one inorganic filler, of which at least a portion of one filler has been coated with a surface-modifying conditioning agent or coating agent over its entire surface or a portion of its surface.

In the process according to the present invention, the foregoing plastics and additives are mixed at temperatures of above 35° C. in a heating mixer, wherein an increasing temperature profile up to temperatures of between about 100° and 125° C. (measured as the material temperature), preferably about 110° to 120° C., is employed. Then the molding composition is cooled in a cooling mixer to temperatures of below about 40° C., preferably below about 35° C.

In an advantageous embodiment, the plastic or the plastic mixture and the additives (except titanium dioxide) which are solid at ambient temperature are premixed in a heating mixer at about 35° to 50° C., preferably about 37° to 45° C., then the liquid additives are admixed after increasing the temperature to achieve a temperature of between about 55° to 65° C., preferably about 57° to 62° C., and subsequently the contents are further mixed employing an increasing temperature profile to about 100° to 125° C. (measured as the material temperature), preferably about 110° to 120° C. Then the molding composition is cooled in a cooling mixer to temperatures of below about 40° C., preferably below about 35° C.

When titanium dioxide is utilized as a pigment, the addition of titanium dioxide to the plastic/additives mixture which has been premixed in the heating mixer is carried out in the range of about 90° to 125° C. (measured as the material temperature), preferably about 110° to 120° C., and then the molding composition is cooled in a cooling mixer to temperatures of below about 40° C., preferably below about 35° C.

The alkaline earth metal oxide or partially hydrated alkaline earth metal oxide, preferably calcium oxide and/or magnesium oxide, partially hydrated calcium oxide and/or partially hydrated magnesium oxide and/or the calcined dolomite or partially hydrated calcined dolomite has, in a preferred embodiment, a mean particle size of less than about 25 μm, preferably less than about 5 μm. Advantageously, the mean particle size is between about 0.5 and 4 μm.

In a preferred embodiment, the amount by weight of the modifying agent or coating agent used for the surface treatment is about 0.02 to 4.5% by weight, preferably about 0.5 to 2.5% by weight, relative to 100 parts by weight of alkaline earth metal oxide or partially hydrated alkaline earth metal oxide, depending on the particle size of the alkaline earth metal oxide or partially hydrated alkaline earth metal oxide, preferably of the calcium oxide, magnesium oxide and/or partially hydrated calcium oxide and/or magnesium oxide.

Advantageously, the filler or filler mixture has a mean particle size of less than about 10 μm, preferably less than about 1 μm. In a preferred embodiment, the mean particle size of the alkaline earth metal oxide or partially hydrated alkaline earth metal oxide is at least twice as large as the mean particle size of the filler or filler mixture.

The above-described molding composition can be utilized in an extrusion process or injection molding process for the production of profiles or articles or hollow articles, particularly extruded window profiles or extruded pipes.

The molded articles and profiles produced from the unplasticized molding compositions according to the present invention have very good surface qualities such as a uniformly smooth surface. The processing properties and properties of the finished articles or of the profiles, including the post-treatment (such as, for example, cutting, welding, drilling, sawing, bending and the like) are comparable or superior to those of molded articles or profiles which have been produced using compounds containing barium, cadmium or lead.

Example 1

| | Additive Group | Parts by wt. |
|---|---|---|
| Suspension - vinyl chloride homopolymer (K value 68) | | 100 |
| Polymethyl methacrylate (PMMA) | g | 1 |
| Talc (micronized) | e | 10 |
| Benzoylstearoylmethane | c | 0.1 |
| 1,4-Dihydropyridine | c | 0.2 |
| Diphenyl decyl phosphite | c | 0.7 |
| Calcium stearate | a | 0.8 |
| Zinc octoate | b | 0.4 |
| Calcium oxide coated with 2% by wt. of hydyroxystearic acid (relative to 100 parts by wt. of CaO) | d | 0.1 |
| Magnesium oxide coated with 2% by wt. of hydroxypalmitic acid (relative to 100 parts by wt. of MgO) | d | 0.15 |
| Mixture of internal and external lubricants containing montan waxes | f | 0.75 |
| High m.p. paraffin wax | f | 0.2 |
| Partly oxidized high m.p. paraffin wax | f | 0.1 |

Example 2

| | Additive Group | Parts by wt. |
|---|---|---|
| Suspension - vinyl chloride homopolymer (K value 68) containing 8 parts by wt. of modifier composed of butyl acrylate and polymethyl methacrylate | | 100 |
| Polymethyl methacrylate (PMMA) | g | 1 |
| Natural calcium carbonate (ground chalk) surface-modified using stearic acid | e | 10 |
| Titanium dioxide | h | 4 |
| Benzoylstearoylmethane | c | 0.1 |
| 1,4-Dihydropyridine | c | 0.1 |
| Trilauryl phosphite | c | 0.5 |
| Mixture of trimethylolpropane, di-trimethylolpropane and pentaerythritol | c | 0.5 |
| Calcium behenate | a | 0.4 |
| Zinc octoate | b | 0.2 |
| Magnesium oxide, coated with 2% by wt. of hydroxystearic acid (relative to 100 parts by wt. of MgO) | d | 0.25 |
| Mixture of internal and external lubricants containing montan waxes | f | 0.75 |
| High m.p. paraffin wax | f | 0.1 |
| Partly oxidized high m.p. paraffin wax | f | 0.1 |

Example 3

| | Additive Group | Parts by wt. |
|---|---|---|
| Vinyl chloride graft copolymer containing 6% by wt. of butyl acrylate | | 100 |
| Polymethyl methacrylate (PMMA) | g | 1 |
| Synthetic calcium carbonate (CCP), coated with 2% by wt. of hydroxystearic acid (relative to 100 parts by wt. of CaCO₃) | e | 5 |
| Titanium dioxide | h | 4 |
| Benzoylstearoylmethane | c | 0.1 |
| 1,4-Dihydropyridine | c | 0.1 |
| Phenyl didecyl phosphite | c | 0.6 |
| Di-trimethylolpropane | c | 0.7 |
| Calcium stearate | a | 0.8 |
| Zinc stearate | b | 0.8 |
| Calcium oxide, coated with 2% by wt. of hydroxystearic acid (relative to 100 parts by wt. of CaO) | d | 0.15 |
| Mixture of internal and external lubricants containing montan waxes | f | 0.75 |
| High m.p. paraffin wax | f | 0.2 |
| Partly oxidized high m.p. paraffin wax | f | 0.1 |

Example 4

| | Additive Group | Parts by wt. |
|---|---|---|
| 80 parts by wt. of suspension-vinyl chloride homopolymer (K value 64) and 20 parts by wt. of vinyl chloride ethylene-vinyl acetate graft copolymer (EVA content 10% by wt.) | | 100 |
| Polymethyl methacrylate (PMMA) | g | 8 |
| Precipitated calcium carbonate of particle size <0.1 μm | e | 4 |
| Titanium dioxide | h | 2 |
| Benzoylstearoylmethane | c | 0.1 |
| 1,4-Dihydropyridine | c | 0.1 |
| Diphenyl decyl phosphite | c | 0.7 |
| Calcium stearate | a | 1.2 |
| Zinc stearate | b | 1.2 |
| Calcined dolomite (micronized) having a particle size of <1 μm, coated with 2% by wt. of hydroxystearic acid (relative to 100 parts by wt. of calcined dolomite) | d | 0.25 |
| Mixture of internal and external lubricants containing montan waxes | f | 0.75 |
| High m.p. paraffin wax | f | 0.2 |
| Partly oxidized high m.p. paraffin wax | f | 0.1 |
| Finely divided sodium bicarbonate | i | 1 |
| Azodicarbonamide | i | 0.35 |
| Antimony trioxide | j | 4 |
| Aluminum hydroxide | j | 3 |

Additive Group:
a = Calcium carboxylate
b = Zinc carboxylate
c = Co-stabilizers
d = Alkaline earth metal oxide
e = Filler
f = Lubricant
g = Processing auxiliary
h = Pigments
i = Blowing agents
j = Flame retardants

What is claimed is:

1. A polyvinyl chloride-based unplasticized molding composition comprising, per 100 parts by weight of PVC or PVC-containing plastic mixture, more than about 70% by weight of at least one PVC component selected from the group consisting of a vinyl chloride homo-, co- or ter-polymer, a mixture thereof, and an alloy of vinyl chloride homo-, co- or ter-polymer having a vinyl chloride or PVC content of more than about 70% by weight, and 0 to about 15% by weight of at least one impact-modifying polymer component selected from the group consisting of an alkyl acrylate polymer, a chlorinated polyethylene, and ethylene-vinyl acetate copolymer and an ethylene-vinyl acetate-carbon monoxide ter-polymer, and, for every 100 parts by weight of the PVC component, the following additives:

(a) about 0.01 to 3 parts by weight of at least one calcium carboxylate, (b) about 0.01 to 3 parts by weight of at least one zinc carboxylate, (c) about 0.01 to 3 parts by weight of at least one organic co-stabilizer selected from the group consisting of β-diketone, dihydropyridine and mixtures thereof with a polyol, (d) about 0.01 to 5 parts by weight of at least one ingredient selected from the group consisting of an alkaline earth metal oxide, an alkaline earth metal oxide, an alkaline earth metal hydroxide and a partially hydrated alkaline earth metal oxide, wherein particles of the above ingredient are coated with a surface modifying conditioning or coating agent on at least a portion of their surface, the conditioning or coating agent comprising a saturated or unsaturated fatty acid which includes, in addition to the COOH group, at least one other polar group, (e) about 0.1 to 15 parts by weight of at least one filler, (f) about 0.01 to 15 parts by weight of at least one external lubricant or internal lubricant or a mixture thereof, and (g) about 0.01 to 5 parts by weight of a processing auxiliary.

2. An unplasticized molding composition as recited in claim 1, comprising, per 100 parts by weight of PVC or PVC-containing plastic mixture, more than about 85% by weight of at least one PVC component.

3. An unplasticized composition as recited in claim 1, wherein additive (d) comprises at least one coated or partially coated ingredient selected from the group consisting of calcium oxide, magnesium oxide, partially hydrated calcium oxide, partially hydrated magnesium oxide, calcined dolomite and partially hydrated calcined dolomite.

4. An unplasticized molding composition as recited in claim 1, wherein additive (e) comprises at least one inorganic filler.

5. An unplasticized molding composition as recited in claim 1, wherein additive (g) comprises a polymeric alkyl methacrylate.

6. An unplasticized molding composition as recited in claim 1, wherein the molding composition comprises the additives (a) through (g), inclusive, in the following amounts:
   about 0.05 to 1.5 parts by weight of (a),
   about 0.05 to 1.5 parts by weight of (b),
   about 0.05 to 2 parts by weight of (c),
   about 0.05 to 1.5 parts by weight of (d),
   up to about 15 parts by weight of (e),
   about 0.05 to 2 parts by weight of (f), and
   about 0.5 to 3.5 parts by weight of (g).

7. An unplasticized molding composition as recited in claim 1, wherein additive (c) includes up to about 70% by weight of a polyol, relative to 100% by weight of additive (c).

8. An unplasticized molding composition as recited in claim 7, wherein additive (c) includes up to about 50% by weight of a polyol.

9. An unplasticized molding composition as recited in claim 1, further comprising as additional additives,
   (h) about 0.01 to 10 parts by weight of a pigment or colorant,
   (i) about 0.05 to 4 parts by weight of at least one blowing agent, and
   (j) about 0.5 to 10 parts by weight of at least one flame retardant.

10. An unplasticized molding composition as recited in claim 9, wherein the molding composition comprises the additives (h) through (j), inclusive, in the following amounts:
    about 0.5 to 5 parts by weight (h),
    about 0.1 to 2 parts by weight (i), and
    about 0.5 to 10 parts by weight of (j).

11. An unplasticized molding composition as recited in claim 1, wherein additive (g) comprises up to 60% by weight, relative to 100 parts by weight of additive (g), of a polymethyl methacrylate (PMMA).

12. An unplasticized molding composition as recited in claim 11, wherein additive (g) comprises up to 35% by weight of a polymethyl methacrylate (PMMA).

13. An unplasticized molding composition as recited in claim 1, wherein the vinyl chloride homo-, co- or ter-polymer has an average K-value of about 58 to 73.

14. An unplasticized molding composition as recited in claim 13, wherein the vinyl chloride homo-, co- or ter-polymer has an average K-value of about 64 to 71.

15. A process for preparing a polyvinyl chloride-based unplasticized molding composition according to claim 1, which comprises the steps of
    (I) mixing the plastic components and the additives at a temperature of above about 35° C. in a heating mixer,
    (II) increasing the temperature up to between about 100° and 125° C., and then
    (III) cooling the molding composition in a cooling mixer to a temperature of below about 40° C.

16. A process as recited in claim 15, wherein step (II) comprises increasing the temperature to between about 110° to 120° C., and step (III) comprises cooling to a temperature of below about 35° C.

17. A process as recited in claim 15, wherein step (I) comprises premixing the plastic components, additive (d) and other additives which are solid at ambient temperatures in a heating mixer at about 35° to 50° C., admixing the liquid additives after increasing the temperature to between about 55° to 65°) C., and step (II) comprises subsequently mixing further the resultant molding composition under an increasing temperature profile up to about 100° to 125° C.

18. A process as recited in claim 17, wherein step (I) comprises premixing at about 37° to 45° C. and admixing at about 57° to 62° C., step (II) comprises subsequently mixing further under an increasing temperature profile up to about 110° to 120° C. and step (III) comprises cooling to below about 35° C.

19. A process as recited in claim 17, further comprising the step of adding about 0.01 to 10 parts by weight of titanium dioxide to the premixed plastic/additives mixture during step (II) at a temperature of about 90° to 125°) C.

20. A process as recited in claim 19, wherein said titanium dioxide is added at 110° to 120° C., and wherein in step (III) said molding composition is cooled to below about 35° C.

21. An extrusion or injection molding process for production of profiles or articles, comprising the step of forming an unplasticized molding composition according to claim 1 to produce a molded article.

22. A window profile comprising an unplasticized molding composition according to claim 1.

23. An unplasticized molding composition as recited in claim 1, wherein the impact-modifying polymer component is present in an amount of up to about 15% by weight.

24. An unplasticized molding composition as recited in claim 23, wherein the impact-modifying polymer component is present in an amount of at least about 6% by weight.

25. An unplasticized molding composition as recited in claim 1, wherein the conditioning or coating agent further comprises an amino group.

26. An unplasticized molding composition as recited in claim 25, wherein the conditioning or coating agent is selected from the group consisting of hydroxystearic acid, hydroxyplamitic acid, hydroxyoleic acid, aminostearic acid, aminolinoleic acid an alkali metal salt thereof.

27. An unplasticized molding composition as recited in claim 1, wherein the conditioning or coating agent is present in an amount of about 0.02 to 4.5% by weight, relative to 100 parts by weight of additive (d).

28. An unplasticized molding composition as recited in claim 27, wherein the conditioning or coating agent is present in an amount of about 0.5 to 2.5% by weight, relative to 100 parts by weight of additive (d).

29. An unplasticized molding composition as recited in claim 1, wherein the particles of additive (d) are pre-coated with the conditioning or coating agent prior to their addition to the composition.

30. An unplasticized molding composition as recited in claim 1, wherein additive (e) is selected from the group consisting of talc, natural calcium carbonate, synthetic calcium carbonate and precipitated calcium carbonate.

31. An unplasticized molding composition as recited in claim 30, wherein particles of additive (e) are coated with a surface-modifying conditioning or coating agent on at least a portion of their surface, the conditioning or coating agent comprising at least one compound selected from the group consisting of a saturated or unsaturated fatty acid, an ester thereof and a salt thereof, the compound including, in addition to the COOH, ester of COO group, respectively, at least one other polar group.

32. An unplasticized molding composition as recited in claim 31, wherein the conditioning or coating agent comprises a saturated or unsaturated fatty acid which includes, in addition to the COOH group, at least one other polar group.

33. An unplasticized molding composition as recited in claim 31, wherein the conditioning or coating agent further comprises an amino group.

34. An unplasticized molding composition as recited in claim 33, wherein the conditioning or coating agent is selected from the group consisting of hydroxystearic acid, hydroxypalmitic acid, hydroxyoleic acid, aminostearic acid, aminolinoleic acid and an alkali metal salt thereof.

35. A process as recited in claim 15, further comprising the step of applying the conditioning or coating agent to the particles surfaces of additive prior the step (I).

36. A process as recited in claim 15 wherein step (I) further comprises mixing as additives,
  (h) about 0.01 to 10 parts by weight of a pigment or colorant,
  (i) about 0.05 to 4 parts by weight of at least one blowing agent, and
  (j) about 0.5 to 10 parts by weight of at least one flame retardant, with the plastic components and additives (a) through (g) (e), inclusive.

* * * * *